(12) United States Patent
Fujitani et al.

(10) Patent No.: US 10,769,551 B2
(45) Date of Patent: Sep. 8, 2020

(54) TRAINING DATA SET DETERMINATION

(71) Applicant: International Business Machines Corporation, Armonk, NY (US)

(72) Inventors: Kanako Fujitani, Saitama Prefecture (JP); Mariko Ishige, Tokyo (JP); Yusuke Nishitani, Tokyo (JP); Yutaka Oishi, Kanagawa Prefecture (JP); Tatsuya Sobue, Kanagawa Prefecture (JP); Masayuki Yamana, Kanagawa Prefecture (JP)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 15/401,433

(22) Filed: Jan. 9, 2017

(65) Prior Publication Data
US 2018/0197106 A1 Jul. 12, 2018

(51) Int. Cl.
*G06N 20/00* (2019.01)

(52) U.S. Cl.
CPC .................. *G06N 20/00* (2019.01)

(58) Field of Classification Search
CPC ..................................... G06N 20/00
See application file for complete search history.

(56) References Cited

U.S. PATENT DOCUMENTS

| 9,336,484 B1* | 5/2016 | Iverson | G06F 16/2462 |
| 2010/0250473 A1* | 9/2010 | Porikli | G06N 20/00 706/12 |
| 2012/0191631 A1* | 7/2012 | Breckenridge | G06N 20/00 706/12 |
| 2013/0097103 A1* | 4/2013 | Chari | G06N 20/00 706/12 |

(Continued)

OTHER PUBLICATIONS

Kaneko et al., "Database Monitoring Index for Adaptive Soft Sensors and the Application to Industrial Process," in 60(1) AIChE J. 160-69 (2014). (Year: 2014).*

(Continued)

*Primary Examiner* — Kamran Afshar
*Assistant Examiner* — Ryan C Vaughn
(74) *Attorney, Agent, or Firm* — Will Stock; Edell, Shapiro & Finnan, LLC

(57) ABSTRACT

Provided herein is a computer readable medium having instructions embodied therewith, the instructions executable by a processor or programmable circuitry of a computer to cause the processor or programmable circuitry to perform operations comprising: selecting a first set of reference training data from a training data set based on a degree of difference between each set of reference training data in the training data set and target training data; determining whether a degree of difference between the target training data and the first set of reference training data is below a first threshold; and determining whether to include the target training data in the training data set using at least a degree (Continued)

of difference between the target training data and at least one second set of reference training data, wherein the at least one second set of reference training data is included in the training data set and does not include the first set of reference training data.

16 Claims, 12 Drawing Sheets

(56) References Cited

U.S. PATENT DOCUMENTS

| | | | |
|---|---|---|---|
| 2014/0088964 A1* | 3/2014 | Bellegarda | G10L 15/063 704/243 |
| 2014/0177947 A1* | 6/2014 | Krizhevsky | G06K 9/6255 382/156 |
| 2015/0356464 A1 | 12/2015 | Lin et al. | |
| 2016/0189048 A1 | 6/2016 | Chang et al. | |
| 2017/0060993 A1* | 3/2017 | Pendar | G06N 20/00 |

OTHER PUBLICATIONS

Raskutti et al., "Extreme Re-balancing for SVMs: A Case Study," in 6.1 ACM Sigkdd Explorations Newsletter 60-69 (2004). (Year: 2004).*

LaRocco et al., "Optimal EEG Feature Selection from Average Distance between Events and Non-Events," in 2014 36th Annual Int'l Conf. IEEE Engineering in Medicine and Biology Soc'y 2641-44 (2014). (Year: 2014).*

Zhen et al., "A Feature Selection Algorithm Based on SVM Average Distance," in 2010 Int'l Conf. Measuring Tech. and Mechatronics Automation 90-93 (2010). (Year: 2010).*

Kaneko et al., "Automatic Database Monitoring for Process Control Systems," Modern Advances in Applied Intelligence, vol. 8481 of the series Lecture Notes in Computer Science, 2014, pp. 410-419, Springer.

Kaneko et al., "Development of a New Index to Monitor Database for Soft Sensors," Journal of Computer Aided Chemistry, vol. 14, 2013, pp. 11-22.

* cited by examiner

TRAINING DATA SET DETERMINATION

BACKGROUND

Technical Field

The present invention embodiments relate to a determination of a training data set used for machine learning.

Related Art

Estimation models have been used to predict various parameters that may be difficult to directly measure. The estimation models are learned from a number of training data sets. Excess training data demands many computing resources to generate the estimation models, and in some cases, reduces the accuracy of the predictions made by the estimation models, for example, by overtraining.

SUMMARY

According to a first aspect of the present invention, provided is a computer readable medium having instructions embodied therewith, the instructions executable by a processor or programmable circuitry of a computer to cause the processor or programmable circuitry to perform operations including selecting a first set of reference training data from a training data set based on a degree of difference between each set of reference training data in the training data set and target training data, determining whether a degree of difference between the target training data and the first set of reference training data is below a first threshold, and determining whether to include the target training data in the training data set using at least a degree of difference between the target training data and at least one second set of reference training data, wherein the at least one second set of reference training data is included in the training data set and does not include the first set of reference training data. The first aspect may also include a method performed by a computer comprising the foregoing computer readable medium, and an apparatus having the above computer readable medium.

The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
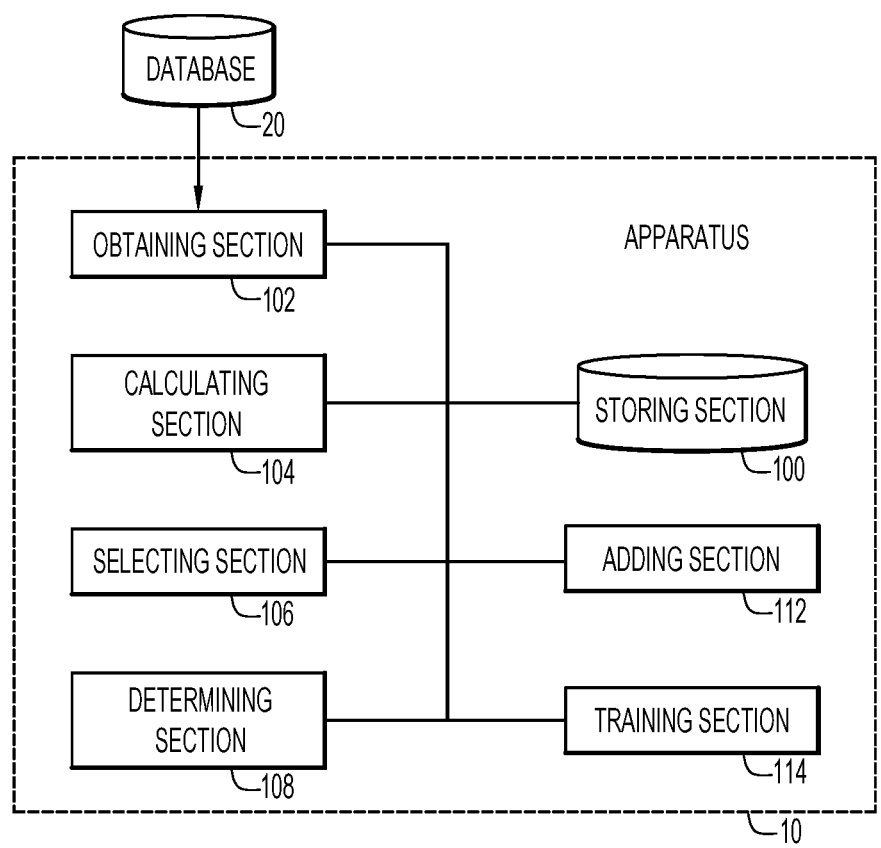
FIG. 1 shows an exemplary configuration of an apparatus, according to an embodiment of the present invention.

FIG. 1 shows an example configuration of an apparatus 10 (e.g., a computer, a programmable circuit, etc.), according to an embodiment of the present invention. The apparatus 10 may determine a plurality of training data sets used for machine-learning models (e.g., estimation models). The apparatus 10 may comprise a processor and one or more computer readable mediums collectively including instructions. The instructions, when executed by the processor or programmable circuitry, may cause the processor or the programmable circuitry to operate as a plurality of operating sections. Thereby, the apparatus 10 may be represented as a storing section 100, an obtaining section 102, a calculating section 104, a selecting section 106, a determining section 108, an adding section 112, and a training section 114.

The storing section 100 may store a variety of data used for operations of the apparatus 10. The storing section 100 may comprise a volatile or non-volatile memory. One or more other elements in the apparatus 10 (e.g., the obtaining section 102, the calculating section 104, the selecting section 106, the determining section 108, the adding section 112, the training section 114, etc.) may communicate data directly or via the storing section 100.

The obtaining section 102 may obtain a training data set including a plurality of sets of reference training data. The obtaining section 102 may also obtain target training data. The plurality of sets of reference training data in the training data set may have been used for training a current model, and the target training data is not necessarily used for training a current model, but may be used for training a new model. The obtaining section 102 may obtain the training data set and/or the target training data from a database 20.

The calculating section 104 may calculate a degree of difference between one set of training data and another set of training data. The calculating section 104 may calculate a degree of difference between each set of reference training data in the training data set and the target training data. The calculating section 104 may calculate a degree of difference between two sets of reference training data in the training data set.

The selecting section 106 may select a first set of reference training data from the plurality of the sets of reference training data in the training data set, based on the degree of difference between each set of reference training data in the training data set and target training data. The selecting section 106 may select the first set of reference training data, which yields the smallest degree of difference from the target training data among all of the sets of reference training data in the training data set.

The selecting section 106 may also select at least one second set of reference training data (which may be simply referred to as "second set of reference training data") from the plurality of the sets of reference training data in the training data set. The second set of reference training data may be included in the training data set and may not include the first set of reference training data.

The selecting section 106 may select the second set of reference training data such that the degree of difference between the target training data and the first set of reference training data is smaller than the degree of difference between the target training data and the second set of reference training data. The selecting section 106 may select two second sets of reference training data including a second-closest-to-target set of reference training data and a closest-to-first-reference set of training data.

The second-closest-to-target set of reference training data may yield the second smallest degree of difference from the target training data among all of the sets of reference training data in the training data set. The closest-to-first-reference set of training data may yield the smallest degree of difference with the first set of reference training data among all training data in the training data set.

The determining section 108 may determine whether a degree of difference between the target training data and the first set of reference training data is below a first threshold. When deciding that the degree of difference between the target training data and the first set of reference training data is below a first threshold, the determining section 108 may determine whether to include the target training data in the training data set to update the training data set.

The determining section 108 may determine whether to include the target training data in the training data set by using at least a degree of difference between the target training data and at least one second set of reference training data. The determining section 108 may determine to include the target training data in the training data set in response to determining that the degree of difference between the target training data and the second-closest-to-target set of reference training data is larger than a degree of difference between the first set of reference training data and the closest-to-first-reference set of training data.

The adding section 112 may update the training data set. The adding section 112 may add the target training data to the training data set in response to the determining section 108 determining to include the target training data in the training data set. The adding section 112 may replace the first set of reference training data with the target training data in the training data set in response to the determining section 108 determining to include the target training data in the training data set.

The training section 114 may train a model (e.g., estimation model) by using at least a portion of the training data set that is updated by the adding section 112 and that includes the target training data.

Figure 2:
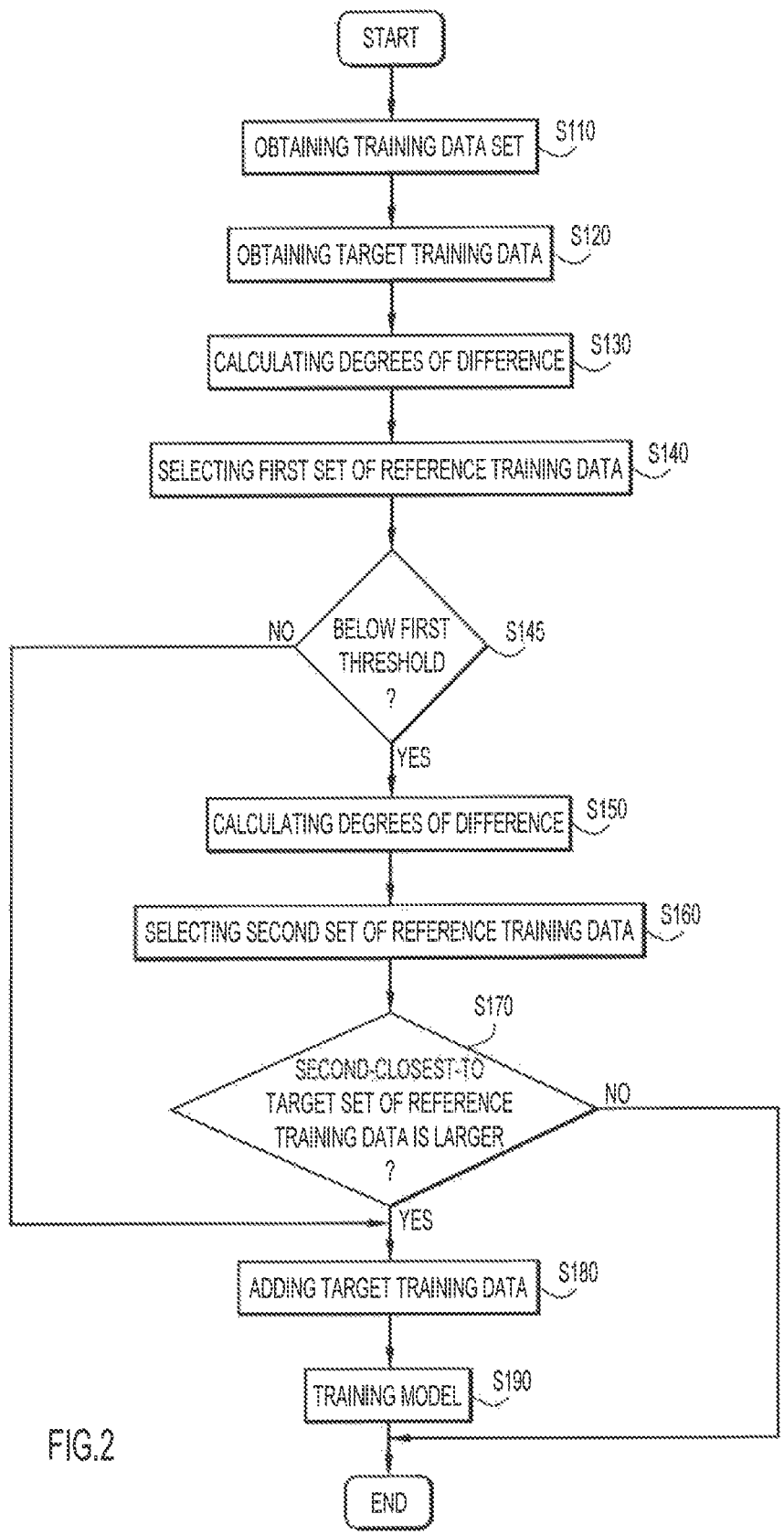
FIG. 2 shows a first operational flow according to an embodiment of the present invention.

FIG. 2 shows a first operational flow according to an embodiment of the present invention. The present embodiment describes an example in which an apparatus, such as the apparatus 10, performs the operations from S110 to S190, as shown in FIG. 2. The apparatus may determine a training data set by performing the operation of S110-S190.

At S110, an obtaining section, such as the obtaining section 102, may obtain a training data set including a plurality of sets of reference training data from a storing section, such as the storing section 100, or an external device or storage medium, such as the database 20.

At S120, the obtaining section may obtain target training data from the storing section 100 or the external device or the storage medium. Training data, such as the sets of reference training data and target training data, may include input data and output data.

The input data of each set of reference training data and the target training data may be represented by a vector. In an embodiment, the input data may include one or more values that are easily measured by one or more sensors (e.g., temperature, pressure, flow rate, etc. measured in a plant).

The output data of each set of reference training data and the target training data may be represented by value(s) or label(s). In some embodiments, the output data may include one or more values that cannot be directly measured and/or that cannot be measured in real time (e.g., solution concentration), and/or one or more labels that cannot be directly obtained (e.g., normal operation and/or abnormal operation).

Output data corresponds to input data in each of the sets of reference training data and the training data. In one embodiment, output data and input data in one set of reference training data or target training data may be derived from one plant at a time. The input data may be used for estimation of corresponding output data by the model. Such estimation may be referred to as a soft sensor.

In some embodiments, the target training data may be newer than the plurality of sets of reference training data in the training data set obtained at S110. In these embodiments, the target training data may be obtained from one plant at a time later than a time when the plurality of sets of reference training data in the training data set are obtained from the plant.

At S130, a calculating section, such as the calculating section 104, may calculate a degree of difference between the target training data and each of the plurality of the sets of reference training data. The calculating section may calculate a database monitoring index (or DMI) between two sets of training data as the degree of difference. DMI is defined by the following formula (1):

$$DMI = \frac{|y_i - y_j|^a}{sim(X_i, X_j)} \quad (1)$$

where $(X_i, y_i)$ and $(X_j, y_j)$ represent pairs of (input data, output data) of training data set i and training data set j, "a" in the formula (1) represents a constant, and "sim $(X_i, X_j)$" represents a similarity between two input data $(X_i$ and $X_j)$.

In some embodiments, "sim $(X_i, X_j)$" may be calculated based on the Euclidean distance and/or Mahalanobis distance between the two input data $(X_i, X_j)$. In these embodiments, "sim $(X_i, X_j)$" may be defined by the following formula (2):

$$sim(X_i, X_j) = \exp(-\gamma \|X_i - X_j\|^2) \quad (2)$$

where $\|X_i - X_j\|$ represents Euclidean distance and/or Mahalanobis distance between the two input data $(X_i, X_j)$, and γ represents a constant.

According to the formulae (1)-(2), the more similar the two input data $(X_i, X_j)$ and/or the two output data $(y_i, y_j)$ become, the smaller the degree of difference between two sets of training data becomes. The constant "a" in the formula (1) may amount to a weight of the output data against the input data. For example, when a value of "a" becomes small (e.g., smaller than 1), the value of DMI becomes larger in response to a minor variation of output data y (e.g., a variation giving $|y_i - y_j| < 1$), such as a drift of a model. On the other hand, when a value of "a" becomes greater than 1, the value of DMI becomes smaller in response to a minor variation of output data y while becoming less vulnerable to noise.

In alternative embodiments, the calculating section 104 may calculate the degree of difference between two sets of training data by other methods. For example, the calculating section 104 may calculate a sum or a product of (i) Euclidean distance and/or Mahalanobis distance between the two input data, and (ii) Euclidean distance and/or Mahalanobis distance between the two output data, as the degree of difference. The calculating section 104 may calculate a similarity between the two sets of training data by at least partially utilizing the above-explained methods or other methods.

At S140, a selecting section, such as the selecting section 106, may select the first set of reference training data that yields the smallest degree of difference from the target training data among all of the sets of reference training data in the training data set, based on the degrees of difference calculated at S130.

Figure 3:
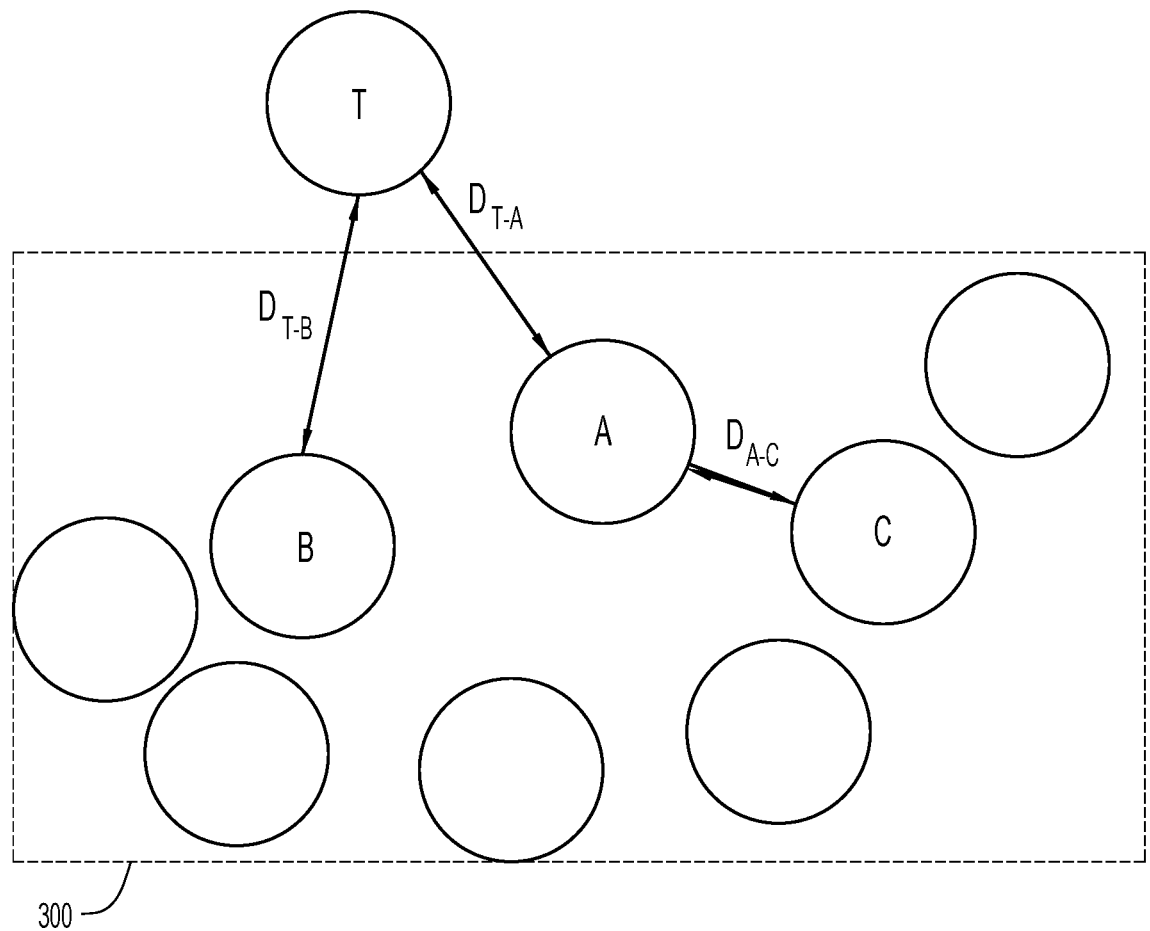
FIG. 3 shows a training data set and target training data according to an embodiment of the present invention.

FIG. 3 shows a training data set 300 and target training data according to an embodiment of the present invention. According to FIG. 3, a training data set 300 includes eight sets of reference training data, each of which is represented by a circle. The target training data is presented as a circle shown as "T." At S140, the selecting section 106 may select set of reference training data "A" from the eight sets of reference training data, when the set of reference training data "A" yields the smallest degree of difference (shown as "$D_{T-A}$") from the target training data "T" among the eight sets of reference training data. The set of reference training data selected by the selecting section 106 at S140 may be referred to as the first set of reference training data.

At S145, a determining section, such as the determining section 108, may determine whether a degree of difference between the target training data and the first set of reference training data is below a first threshold. The determining section 108 may proceed with an operation of S150 if the decision is positive. The determining section 108 may proceed with an operation of S180 if the decision is negative. In an alternative embodiment, the determining section may end the operations of FIG. 2 if the decision is negative.

At S150, the calculating section 104 may calculate the degree of difference between the first set of reference training data and the other sets of reference training data in the training data set. The calculating section 104 may perform the calculation in a manner explained in relation to the operation of S130.

At S160, the selecting section 106 may select one or more second sets of reference training data. The selecting section 106 may select a second-closest-to-target set of reference training data and a closest-to-first-reference set of training data as the second set of reference training data. The selecting section 106 may select any set of reference training data from the training data set as the second set of reference training data except the first set of reference training data.

In the embodiment of FIG. 3, the selecting section 106 may select set of reference training data "B" as the second-closest-to-target set of reference training data from the seven sets of reference training data of the training data set without the first set of reference training data "A", when the degree of difference between the target training data "T" and the first set of reference training data "B" (shown as $D_{T-B}$) is the smallest among the degree of difference between the target training data "T" and each of the seven sets of reference training data.

In the embodiment of FIG. 3, the selecting section 106 may also select set of reference training data "C" as the closest-to-first-reference set of training data from the seven sets of reference training data of the training data set other than the first set of reference training data "A", when the degree of difference between the first set of reference training data "A" and the set of reference training data "C" (shown as $D_{A-C}$) is the smallest among the degree of differences between the first set of reference training data "A" and each of the seven other sets of reference training data.

In some embodiments, the second-closest-to-target set of reference training data and the closest-to-first-reference set of training data can be the same. In other embodiments, the second-closest-to-target set of reference training data and the closest-to-first-reference set of training data cannot be the same.

At S170, the determining section 108 may determine whether the degree of difference between the target training data and the second-closest-to-target set of reference training data is larger than the degree of difference between the first set of reference training data and the closest-to-first-reference set of training data. In the embodiment of FIG. 3, the determining section may determine whether $D_{T-B}$ is larger than $D_{A-C}$ or not. If the decision is positive, the determining section 108 may determine to add the target training data to the training data set and proceed with S180, and if the decision is negative, then the determining section 108 may end the operations of FIG. 2.

At S180, an adding section, such as the adding section 112, may update the training data set by adding the target training data to the training data set. In an embodiment, the adding section 112 may replace the first set of reference training data with the target training data. In other embodiments, the adding section 112 may add the target training data to the training data set without deleting the first set of reference training data.

Figure 4:
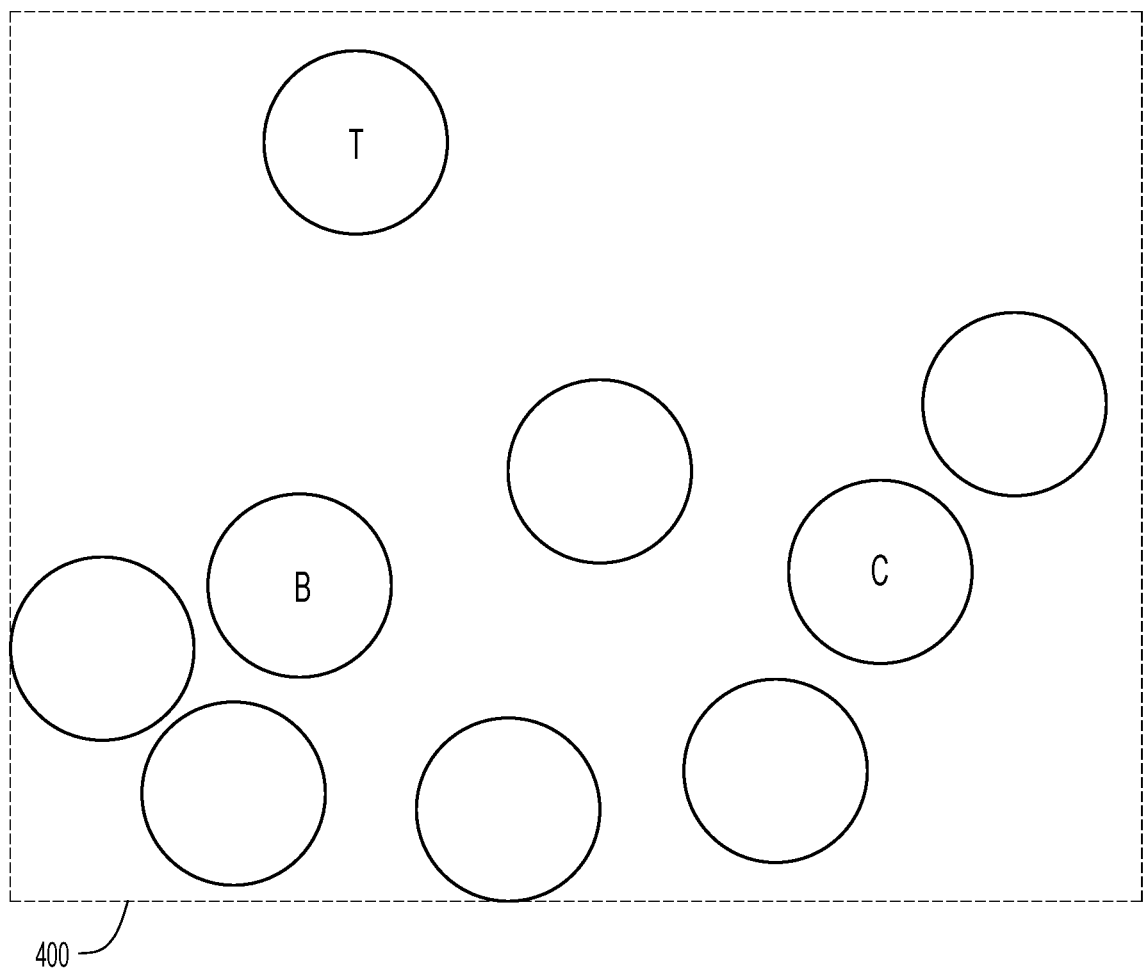
FIG. 4 shows the training data set after adding the target training data according to an embodiment of the present invention.

FIG. 4 shows the training data set after adding the target training data according to an embodiment of the present invention. In the embodiment of FIGS. 3-4, the adding section 112 may replace the first set of reference training data A with the target training data T in the training data set 300 in FIG. 3, and as a result generate a training data set 400 shown in FIG. 4.

In general, the more distant training data is from other training data, the more informative the training data is. In a case where S180 is performed, the first set of reference training data "A" is less informative than the target training data "T" because the target training data "T" is more distant from the other set of reference training data than the first set of reference training data "A". Thus by the operation of S180, the adding section can replace less informative training data in the training data set (such as the first set of reference training data "A") with the more informative training data (such as the target training data "T").

At S190, a training section, such as the training section 114, may train a model using all or a part of training data in the training data set updated at S180. In some embodiments, the training section 114 may update an adaptive model such as online support vector regression by using the training data set updated by the adding section. In other embodiments, the training section 114 may train another type of regression model using the updated training data set. The training section 114 may train neural networks or other models used for machine learning using the updated training data set. In the embodiment of FIG. 4, the training section 114 may perform training using eight sets of training data in the updated training data set 400.

In response to obtaining target training data, the apparatus may add the target training data to a training data set if the target training data is more informative than the nearest set of reference training data in the training data set. In other words, the apparatus may update the training data set with a new training data if it is beneficial. Thereby, the apparatus may limit the number of training data in the training data set, while saving computational resources used for training an estimation model, and maintaining the accuracy of the estimation model by avoiding overtraining.

In some embodiments, the apparatus may repeat operations S120-S190. For example, the apparatus may repeatedly obtain new training data as new target training data from a plant by monitoring operational conditions of the plant. In the example, the apparatus may perform operations of S120-S190 for each new target training data.

The apparatus may treat the training data set updated at S180 as the training data set for the next iteration of S120-S190. Thereby, the apparatus may determine whether to update the training data set with the new target training data based on whether the new target training data is informative. Many embodiments may be applied to adaptive models such as Moving Window (MW) model and/or Just-in-Time (JIT) model, which may keep updating the estimation model.

In some embodiments, the apparatus may eliminate a set of reference training data from the training data set, without adding the target training data. In these embodiments, the selecting section may randomly select one of the sets of reference training data from the training data set instead of obtaining the target training data at S120, and then perform at least some of operations S130-S190 by treating the selected set of reference training data as the target training data. In these embodiments, the apparatus may eliminate the selected set of reference training data from the training data set if the decision of S145 or S170 is negative, and may eliminate the first set of reference training data at S180.

Thereby, the apparatus may reduce the number of training data in the training data set while maintaining a diversity of training data in the training data set to reduce computational resources used for training. The apparatus may repeat the elimination of a set of reference training data from the training data set.

In some embodiments, at S145, the determining section 108 may determine whether a number of the sets of reference training data in the training data set exceeds a threshold number additionally or alternatively to comparing the degree of difference to the first threshold. Thereby, the determining section 108 may proceed with operations of adding the target training data only when a size of the training data set is sufficiently small.

In some embodiments, at S170, the determining section 108 may determine whether to add the target training data based on not only (a) the degree of difference between the target training data and the second-closest-to-target set of reference training data, and (b) the degree of difference between the first set of reference training data and the closest-to-first-reference set of training data, but also (c) one or more of the degrees of difference between the target training data and each other second set of reference training data (e.g., third-closest-to-target set of reference training data, fourth-closest-to-target set of reference training data, etc.) in the training data set, and (d) one or more of the degrees of difference between the first set of reference training data and each other second set of reference training data (e.g., second closest-to-first-reference set of training data, third closest-to-first-reference set of training data, etc.) in the training data set.

In these embodiments, the determining section 108 may determine to include the target training data in the training data set in response to determining that an average degree of difference between the target training data and a plurality of the second sets of reference training data (e.g., an average of (1) the degree of difference between the target training data and the second-closest-to-target set of reference training data, (2) the degree of difference between the target training data and the third-closest-to-target set of reference training data, (3) the degree of difference between the target training data and the fourth-closest-to-target set of reference training data, . . . (n−1) the degree of difference between the target training data and the $n^{th}$-closest-to-target set of reference training data) is larger than an average degree of difference between the first set of reference training data and a plurality of second sets of reference training data (e.g., an average of (1) the degree of difference between the first set of reference training data and the closest-to-first-reference set of training data, (2) the degree of difference between the first set of reference training data and the second closest-to-first-reference set of training data, . . . , (n−1) the degree of difference between the first set of reference training data and the $(n-1)^{th}$-closest-to-first-reference set of training data), where n is a number equal to or less than the number of the sets of reference training data in the training data set.

Figure 5:
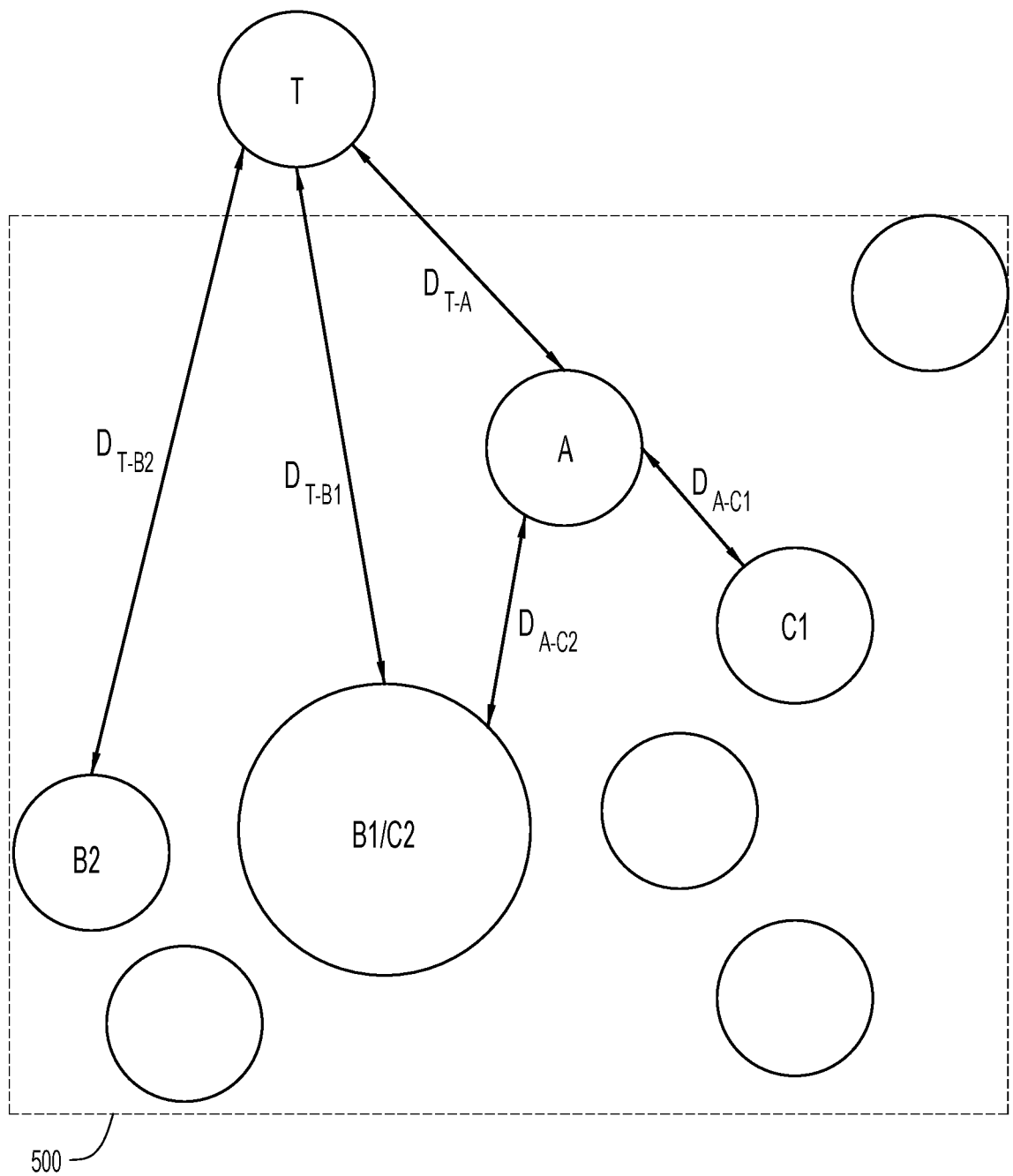
FIG. 5 shows a training data set and target training data according to an embodiment of the present invention.

FIG. 5 shows a training data set 500 and target training data according to an embodiment of the present invention. In the embodiment of FIG. 5, the determining section 108 may determine whether to add the target training data T based on a first set of reference training data A and three second sets of reference training data B1/C2, B2, and C1. The second set of reference training data B1/C2 is both the second-closest-to-target set of reference training data (shown as B1) and the second-closest-to-first-reference set of training data (shown as C2). The second set of reference training data C1 is the closest-to-first-reference set of training data. The second set of reference training data B2 is the third-closest-to-target set of reference training data.

The calculating section may calculate the degrees of difference $D_{T-A}$ between T and A, $D_{T-B1}$ between T and B1/C2, $D_{T-B2}$ between T and B2, $D_{A-C2}$ between A and B1/C2, and $D_{A-C1}$ between A and C1. The determining section 108 may determine to replace the first set of reference training data A with the target training data T in response to determining that an average of $D_{T-B1}$ and $D_{T-B2}$ is larger than an average of $D_{A-C1}$ and $D_{A-C2}$.

In a further alternative embodiment, at S170, the determining section 108 may determine whether to add the target training data based on one second set of reference training data. In these embodiments, the determining section 108 may determine to add the target training data if the degree of difference between the target training data and the one second set of reference training data is above a threshold.

In other alternative embodiments, the apparatus may not perform some of operations S110-S190. In these embodiments, the apparatus may not perform S150-S170.

Figure 6:
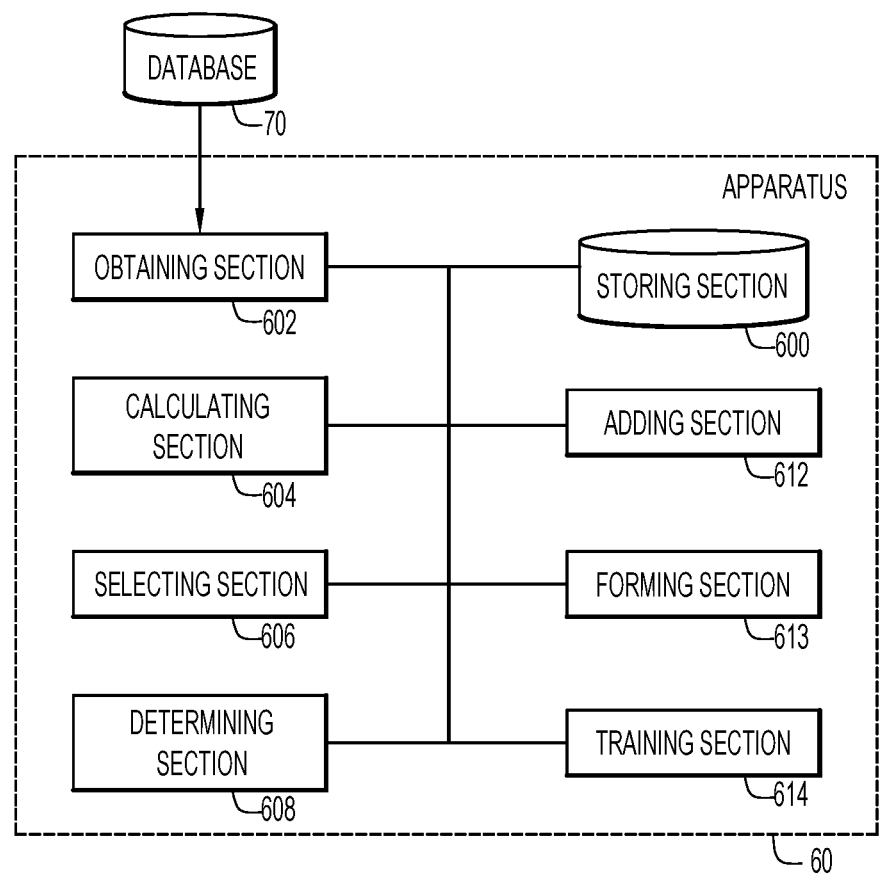
FIG. 6 shows an example configuration of an apparatus, according to another embodiment of the present invention.

FIG. 6 shows an example configuration of an apparatus 60 (e.g., a computer, a programmable circuit, etc.), according to another embodiment of the present invention. The apparatus 60 may determine a plurality of training data used for machine-learning models (e.g., estimation models). The apparatus 60 may comprise a processor and one or more computer readable mediums collectively including instructions. The instructions, when executed by the processor or programmable circuitry, may cause the processor or the programmable circuitry to operate as a plurality of operating sections. Thereby, the apparatus 60 may be represented as a storing section 600, an obtaining section 602, a calculating section 604, a selecting section 606, a determining section 608, an adding section 612, a forming section 613, and a training section 614.

In embodiments explained in relation to FIG. 6, the apparatus 60 may generate a plurality of training data sets as a plurality of groups of training data, and select training data from the plurality of groups for performing machine learning.

The storing section 600, the obtaining section 602, the calculating section 604, the selecting section 606, the determining section 608, the adding section 612, and the training section 614 may have substantially the same function with the storing section 100, the obtaining section 102, the calculating section 104, the selecting section 106, the determining section 108, the adding section 112, and the training section 114, which are explained in the embodiments in relation to FIGS. 1-5, unless otherwise specified.

Hereinafter, the storing section 600, the obtaining section 602, the calculating section 604, the selecting section 606, the determining section 608, the adding section 612, and the training section 614 may be explained in terms of differences from the storing section 100, the obtaining section 102, the calculating section 104, the selecting section 106, the determining section 108, the adding section 112, and the training section 114.

The obtaining section 602 may obtain target training data and a plurality of training data sets. Each of the plurality of training data sets may include a plurality of sets of reference training data. The plurality of training data sets may be regarded as a plurality of groups of training data, where one or more similar sets of reference training data may be allocated to the same group.

The calculating section 604 may calculate a degree of difference between each set of reference training data in the plurality of training data sets, and the target training data. The calculating section 604 may further calculate a degree of difference between two sets of training data in a training data set.

The selecting section 606 may select the first set of reference training data, which yields the smallest degree of difference from the target training data, among all of the sets of reference training data in the plurality of training data sets. The selecting section 606 may select a training data set that includes the first set of reference training data, which may be referred to as "target training data set."

The selecting section 606 may also select the at least one second set of reference training data, which includes a farthest-from-target set of reference training data that gives the largest degree of difference with the target training data among all set of reference training data in the target training data set. Thereby, the selecting section 606 may select the second set of reference training data from the same group as the first set of reference training data.

The determining section 608 may determine whether a degree of difference between the target training data and the first set of reference training data is below a first threshold. In determining whether the degree of difference between the target training data and the first set of reference training data is below a first threshold, the determining section 608 may further determine whether to include the target training data in the target training data set.

The determining section 608 may determine whether to include the target training data in the training data set by using at least a degree of difference between the target training data and at least one second set of reference training data. In some embodiments, the determining section 608 may determine to include the target training data in the target training data set in response to determining that the degree of difference between the target training data and the farthest-from-target set of reference training data is below a second threshold.

The adding section 612 may add the target training data to the target training data set that corresponds to one group among the plurality of groups of training data, in response to the determining section 608 determining to include the target training data in the target training data set.

The forming section 613 may form a selected data set for performing machine learning. The forming section 613 may select one or more sets of reference training data from each of the plurality of groups of training data to form the selected data set.

The training section 614 may train a model (e.g., estimation model). The training section 614 may perform machine learning using the selected data set including one or more sets of reference training data selected by the forming section 613.

Figure 7:
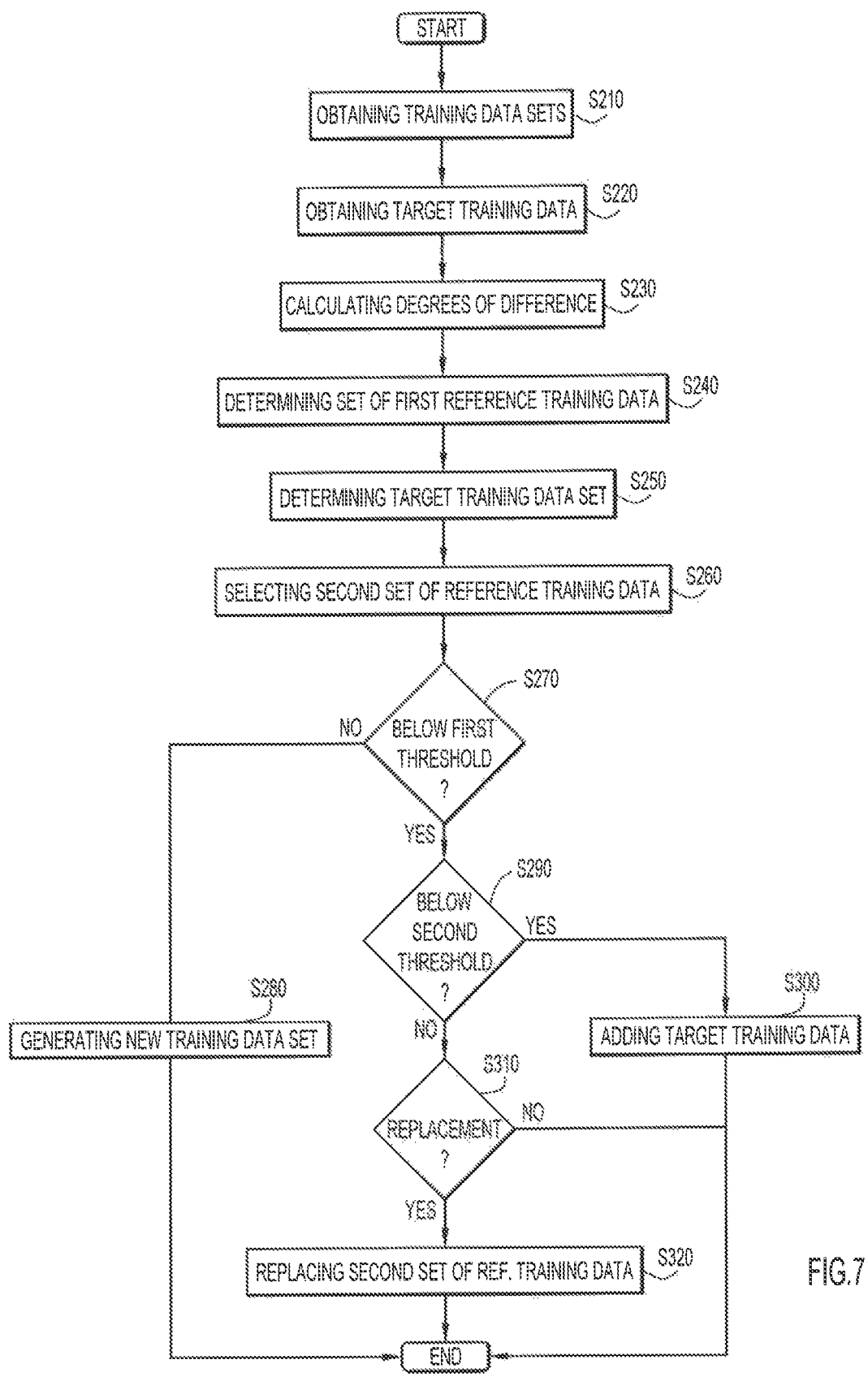
FIG. 7 shows a second operational flow according to an embodiment of the present invention.

FIG. 7 shows a second operational flow according to an embodiment of the present invention. The present embodiment describes an example in which an apparatus, such as the apparatus 60, performs the operations from S210 to S320, as shown in FIG. 7. The apparatus may determine whether to add target training data to a training data set (i.e., a group of training data) by performing the operations S210-S320.

At S210, an obtaining section, such as the obtaining section 602, may obtain a plurality of training data sets from a storing section such as the storing section 600 or an external device or storage medium such as the database 70. The plurality of sets of reference training data in each training data set may be close to each other in terms of the degree of differences between sets of reference training data. In some embodiments, a number of sets of reference training data are grouped into the plurality of training data sets, such that each set of reference training data has at least one set of reference training data having a degree of difference from each other set of reference training data below a threshold, in each training data set.

At S220, the obtaining section 602 may obtain target training data from the storing section or the external device or storage medium. The operations of S210 and S220 may be performed in substantially the same manner as the operations S110 and S120, except as otherwise specified.

At S230, a calculating section, such as the calculating section 604, may calculate a degree of difference between the target training data and each set of reference training data in the plurality of training data sets. In some embodiments, the calculating section 604 may calculate a database monitoring index (or DMI) between two sets of training data as the degree of difference as explained in relation to the operation of S130.

At S240, a selecting section, such as the selecting section 606, may determine the first set of reference training data among all sets of reference training data of the plurality of the training data sets, based on the degree of difference between the target training data and each set of reference training data in each plurality of training data sets. In some embodiments, the selecting section 606 may select the set of reference training data that yields the smallest degree of difference from the target training data, as the first set of reference training data.

At S250, the selecting section 606 may select a target training data set among the plurality of training data sets. In other words, the selecting section may determine one group from a plurality of groups corresponding to the plurality of training data sets. The selecting section may select, as the target training data set, a training data set that includes the first set of reference training data selected at S240.

Figure 8:
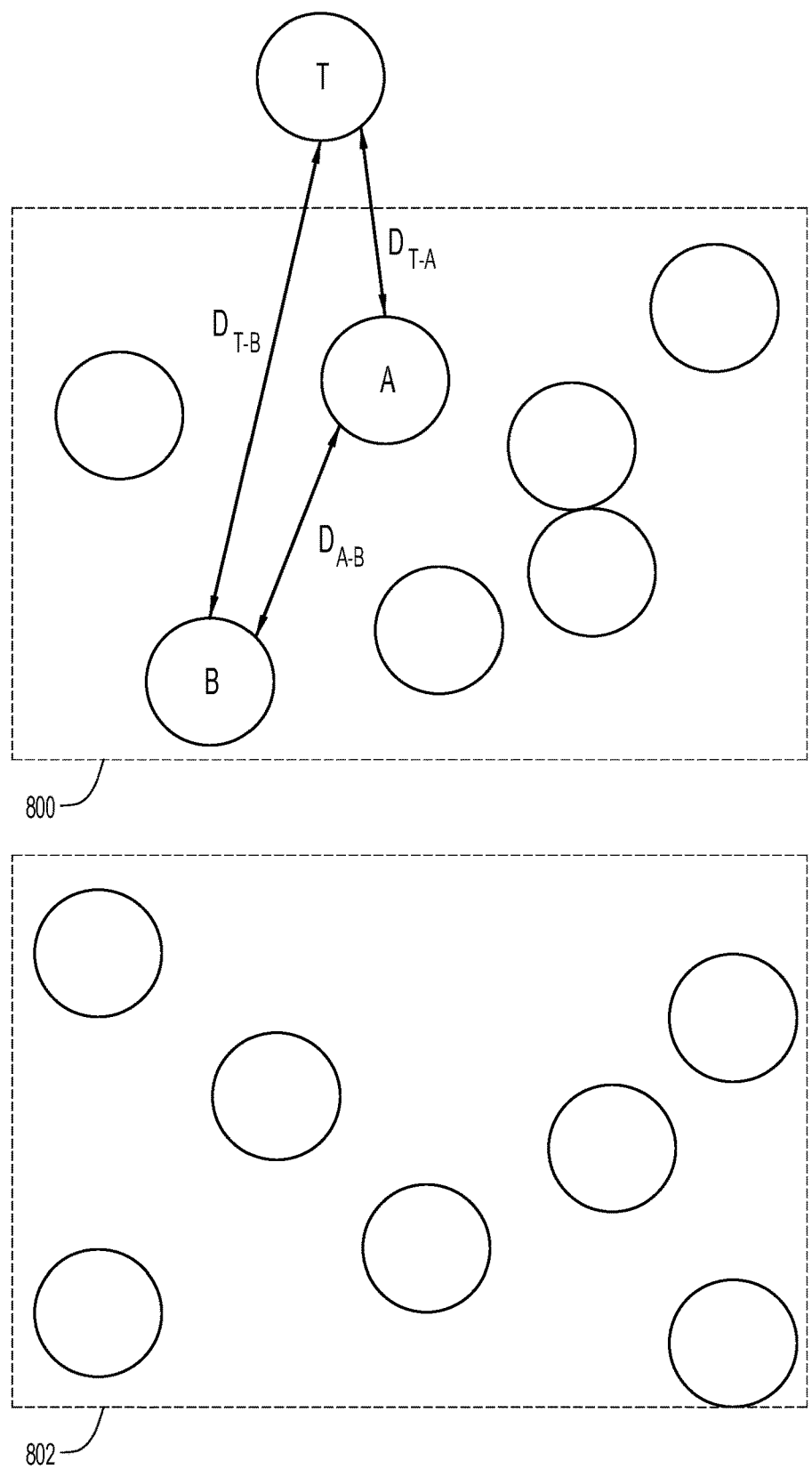
FIG. 8 shows training data sets and target training data according to an embodiment of the present invention.

FIG. 8 shows training data sets and target training data according to an embodiment of the present invention. According to FIG. 8, a plurality of training data sets comprises a training data set 800 and a training data set 802. All fourteen training data sets shown in FIG. 8 are grouped into a group corresponding to the training data set 800 and a group corresponding to the training data set 802.

The target training data is presented as a circle shown as "T." At S240, the selecting section may select training data "A" from among all fourteen sets of training data as the first set of reference training data, if the set of training data "A" yields the smallest degree of difference (shown as "$D_{T\text{-}A}$") from the target training data "T" among the fourteen sets of training data. At S250, the determining section 608 may select the training data set 800 as the target training data set.

At S260, the selecting section 606 may select one or a plurality of second sets of reference training data. The selecting section 606 may select, as a second set of reference training data, a farthest-from-target set of reference training data that gives the largest degree of difference with the target training data among all sets of reference training data in the target training data set selected at S250.

In the embodiment of FIG. 8, the selecting section 606 may select set of reference training data "B" as the farthest-from-target set of reference training data from among the seven sets of reference training data of the training data set 800. The set of reference training data "B" yields the largest degree of difference (shown as "$D_{T\text{-}B}$") from the target training data "T" among the seven sets of training data in the training data set 800.

At S270, a determining section, such as the determining section 608, may determine whether a degree of difference between the target training data and the first set of reference training data is below a first threshold. The determining section 608 may proceed with an operation of S290 if the decision is positive. The determining section 608 may proceed with an operation of S280 if the decision is negative.

At S280, an adding section, such as the adding section 612, may generate a new training data set including the target training data, as a new group of training data.

Figure 9:
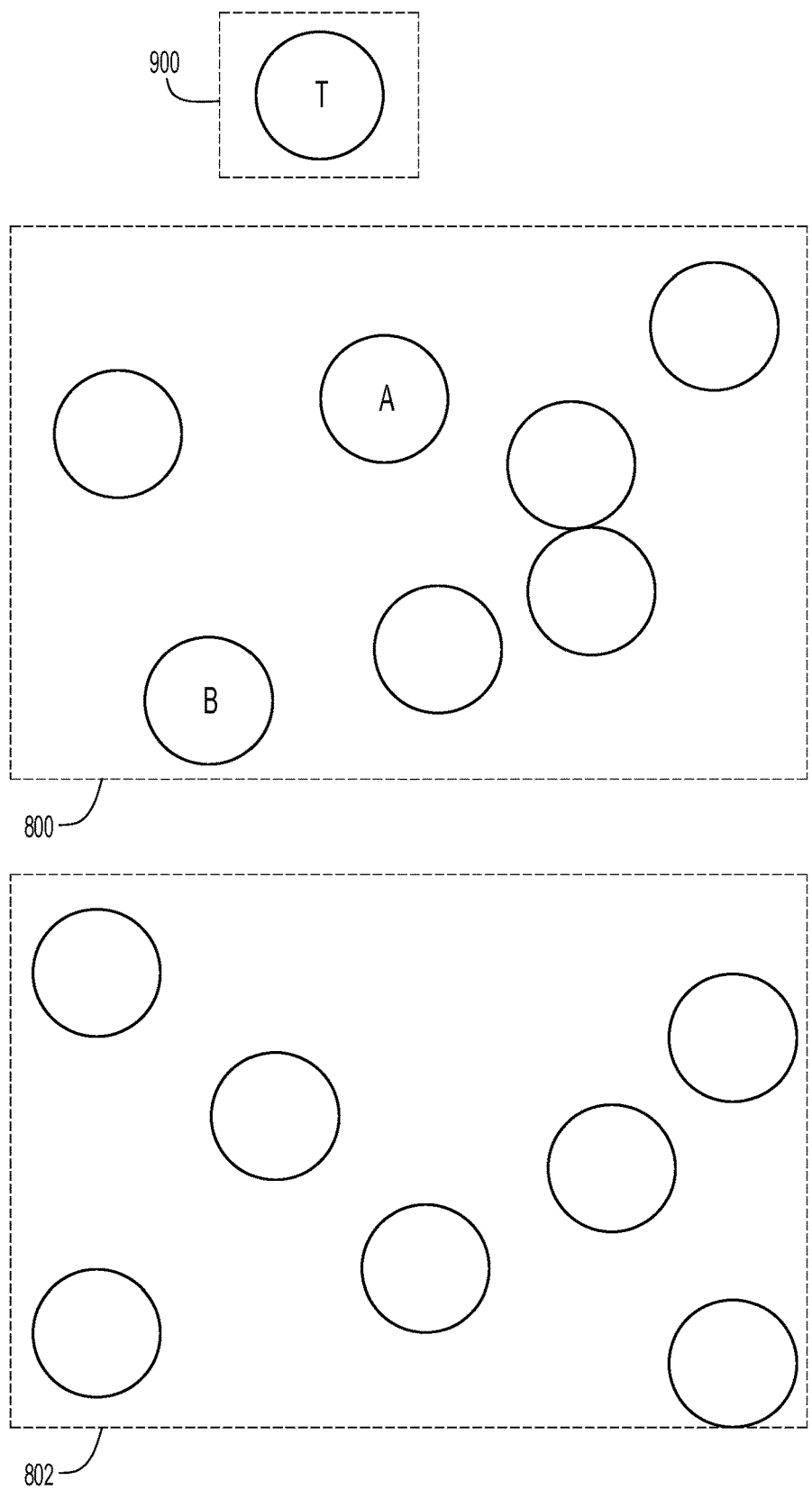
FIG. 9 shows the training data sets after generating a new group according to an embodiment of the present invention.

FIG. 9 shows the training data sets after the adding section 612 generates a new training data set according to an embodiment of the present invention. In the embodiment of FIG. 8 and FIG. 9, the adding section 612 may generate a new training data set 900 including only the target training data T shown in FIG. 9. As a result, the adding section 612 may generate a new group in addition to the existing two groups corresponding to the training data sets 800 and 802. In an alternative embodiment, the adding section 612 may abandon the target training data instead of generating the new training data set.

At S290, the determining section 608 may determine whether the degree of difference between the target training data and the farthest-from-target set of reference training data selected at S260 is below a second threshold. The second threshold may be larger than the first threshold. The determining section 608 may proceed with an operation of S300 if the decision is positive. The determining section 608 may proceed with an operation of S310 if the decision is negative.

At S300, the adding section 612 may add the target training data to the target training data set selected at S250. Thereby, the adding section 612 may add the target training data to the one group of the plurality of groups.

Figure 10:
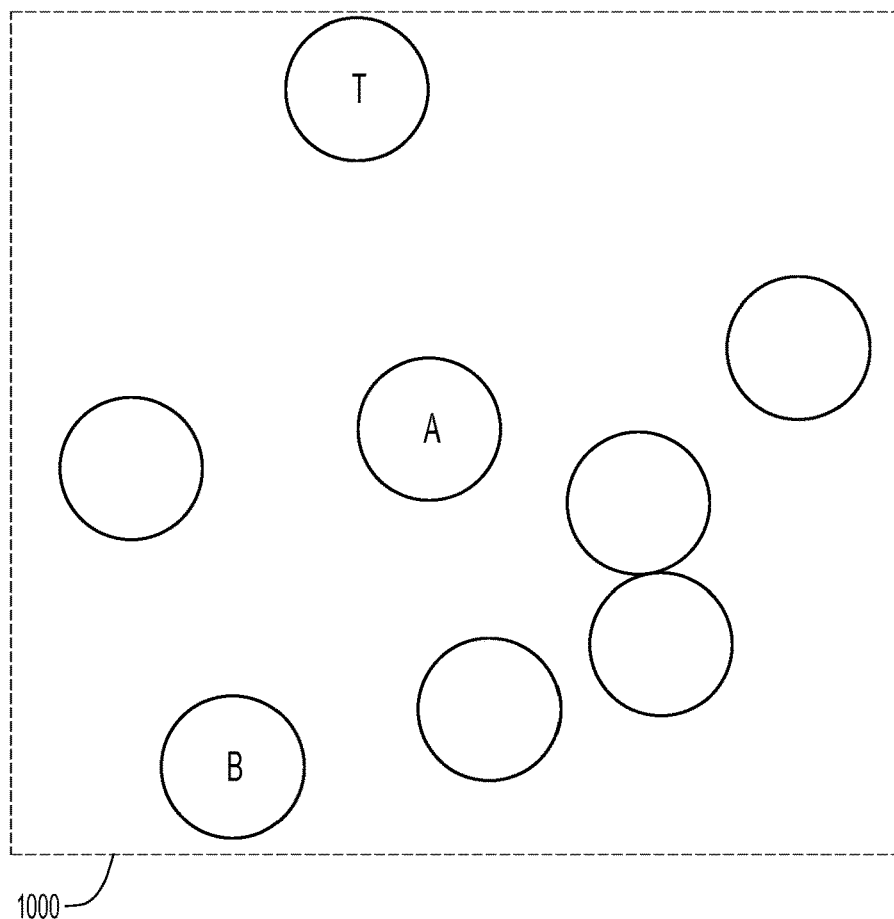
FIG. 10 shows the training data sets after adding the target training data according to an embodiment of the present invention.
Figure 10:
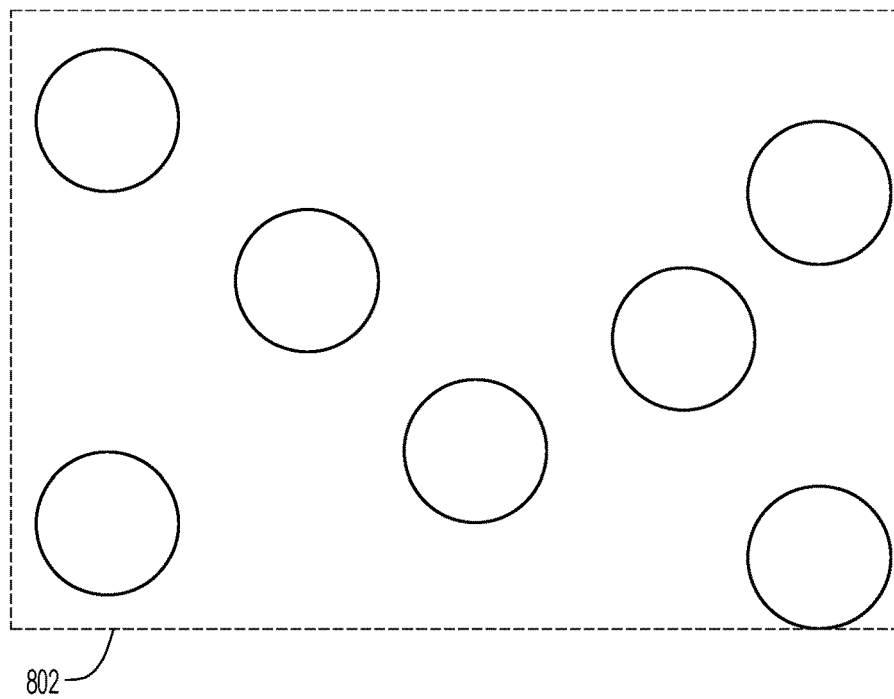

FIG. 10 shows the training data sets after the adding section 612 adds the target training data according to an embodiment of the present invention. In the embodiment of FIG. 8 and FIG. 10, the adding section 612 may add the target training data T to the training data set 800 in FIG. 8, and as a result generate a training data set 1000 shown in FIG. 10.

At S310, the determining section 608 may determine whether to replace the farthest-from-target set of reference training data (i.e., the second set of reference training data) with the target training data in the target training data set. The calculating section 604 may calculate a degree of difference between the farthest-from-target set of reference training data and the first set of reference training data, and the determining section 608 may determine whether the degree of difference between the target training data and the first set of reference training data is smaller than the degree of difference between the farthest-from-target set of reference training data and the first set of reference training data.

In the embodiment of FIG. 8, the determining section 608 may determine whether $D_{T\text{-}A}$ is smaller than $D_{A\text{-}B}$ or not. The determining section 608 may proceed with an operation of S320 if the decision is positive. The determining section 608 may end the operations of FIG. 7 if the decision is negative.

At S320, the adding section 612 may include the target training data in the target training data set and exclude the farthest-from-target set of reference training data from the target training data set. In the embodiment of FIG. 8, the adding section 612 may replace the second set of reference training data B with the target training data T.

Thereby, the adding section 612 may perform the replacing in response to the determining section 608 determining (i) that the degree of difference between the target training data and the first set of reference training data is below the first threshold, (ii) that the degree of difference between the target training data and the farthest-from-target set of reference training data is equal to or above a second threshold, and (iii) that the degree of difference between the target training data and the first set of reference training data is smaller than the degree of difference between the farthest-from-target set of reference training data and the first set of reference training data, during the operations of S210-S320.

As explained above, during the operations of S210-S320, the apparatus may obtain the target training data and the plurality of training data sets, identify one training data set nearest to the target training data as a target training data set, and determine whether to add the target training data to the target training data set. According to the operations of FIG. 7, when a new target training data is obtained, the apparatus can determine to which group the new target training data belongs, based on the degree of difference between sets of training data.

In addition, the apparatus may generate the new group of training data including the target training data in response to determining not to add the target training data to the one group of the plurality of groups of training data.

In alternative embodiments, the selecting section 606 may determine a target training data set (i.e., one group) and the first set of reference training data by calculating an average of degrees of difference between the target training data and set of reference training data of each training data set, instead of performing S240-S250.

In these embodiments, the calculating section 604 may calculate an average degree of difference between the target training data and each of the plurality of sets of reference training data of each training data set. In the example of FIG. 8, the calculating section 604 may calculate an average of seven degrees of difference between the target training data T and each of the seven sets of reference training data in the training data set 800, and an average of the seven degrees of difference between the target training data T and each of the seven sets of reference training data in the training data set 802.

The selecting section 606 may identify a target training data set of which the average is the smallest among the plurality of training data sets. Then the selecting section 606 may select the first set of reference training data, which yields the smallest degree of difference from the target training data, from the identified one training data set.

In alternative embodiments, the apparatus may not perform some of operations S210-S320. In these embodiments, the apparatus may not perform S310-S320 and/or S280.

Figure 11:
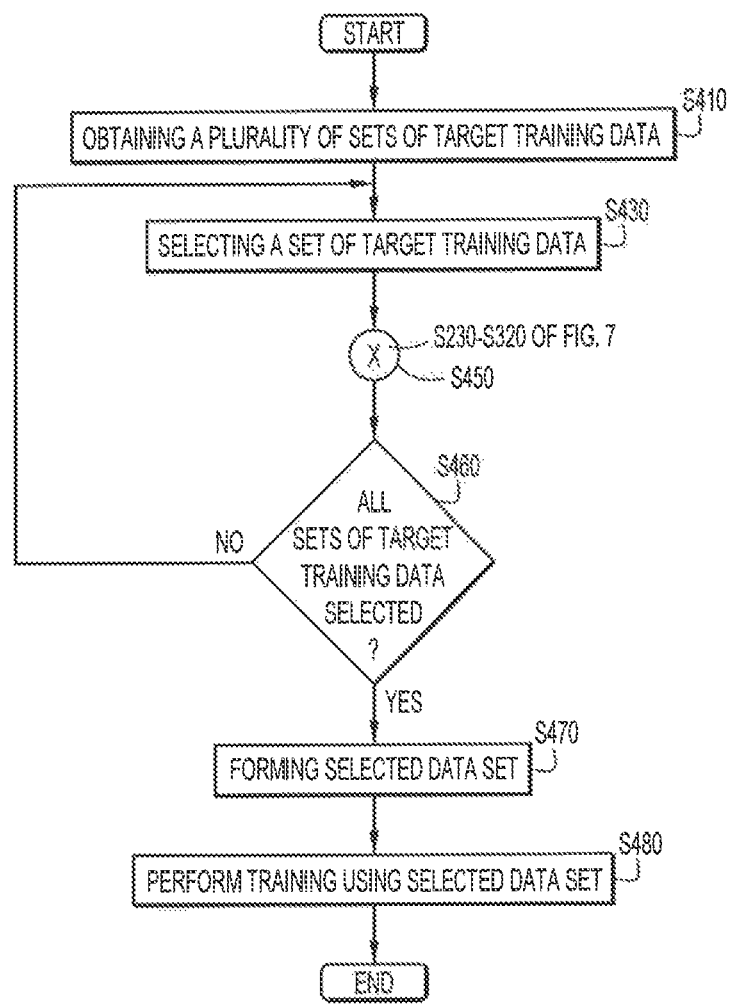
FIG. 11 shows a third operational flow according to an embodiment of the present invention.

FIG. 11 shows a third operational flow according to an embodiment of the present invention. The present embodiment describes an example in which an apparatus, such as the apparatus 60, performs the operations from S410 to S480, as shown in FIG. 11. The apparatus may form a selected data set by performing the operations of S410-S480. The selected data set may be used for machine learning.

At S410, an obtaining section, such as the obtaining section 602, may obtain a plurality of sets of target training data. Each of the plurality of sets of target training data may be a candidate of the selected data set later generated and used for machine learning. Each of the plurality of sets of target training data may be the same or similar to the target training data explained in relation to S120 and S220.

At S430, a selecting section, such as the selecting section 606, may select a set of target training data from the plurality of sets of target training data obtained at S410. The selecting section 606 may select a set of target training data that has not been selected at previous operation(s) of the S430 in iterations of a loop of S430-S470.

At S450, the apparatus performs operations substantially similar to operations S230-S320 explained in relation to FIG. 7 for the set of target training data selected at S430. Thereby, the apparatus may add the target training data to one of existing groups (i.e., one of the training data sets), replace one set of reference training data in the target training data set with the set of target training data, or generate a new training data set (i.e., a new group) for the set of target training data. In an embodiment, the apparatus may generate a new training data set at S450.

At S460, the selecting section 606 may determine whether all sets of target training data obtained at S410 have been selected at iterations of S430. If all the sets of target training data have not been selected, then the selecting section 606 may go back to S430. If all the sets of target training data have been selected, then the selecting section 606 may proceed with S470.

At S470, a forming section, such as the forming section 613, may form a selected data set based on a plurality of training data sets (i.e., a plurality of groups) generated at iterations of S450. The forming section 613 may pick up a predetermined number of sets of training data from each of the plurality of training data sets to generate the selected data set. For example, when a training data set X, a training data set Y, and a training data set Z are generated during the iterations of S450 each including one thousand sets of training data, the forming section 613 may randomly pick up one hundred sets of training data from each of the training data set X, the training data set Y, and the training data set Z, and form a selected data set including three hundred sets of training data.

At S480, a training section, such as the training section 614, may train an estimation model using training data of the selected data set formed at S470. In an embodiment, the estimation model may function as a soft sensor.

As explained above, during the operations of S410-S480, the apparatus may obtain a plurality of sets of target training data, group the plurality of sets of target training data into a plurality of training data sets based on the degree of difference, and train the estimation model based on training data selected from each of the plurality of training data sets. Since the training data of the selected data set are selected from different training data sets (i.e., different groups), the selected data set may enable training of the estimation model with balanced training data to improve accuracy of the estimation model.

The embodiments explained in relation to FIG. 11 may be applied to generate a small portion of training data from a large number of training data. For example, the apparatus may perform operations of S410-S480 to generate training data used for a mini batch.

In embodiments related to the operations of FIG. 11, the apparatus may perform the operation S450 such that numbers of sets of training data in the plurality of training data sets are the same or within a predetermined range. In these embodiments, the determining section 608 may modify the first threshold and/or the second threshold such that a number of sets of training data included in a training data set having less training data increases, during the iterations of S450.

In some embodiments, the first threshold and the second threshold are different among the plurality of training data sets. For example, a first threshold and a second threshold used for a first training data set are higher than a first threshold and a second threshold used for a second training data set, if a number of sets of training data of the second training data set is larger than a number of sets of training data of the first training data set, in order to even the numbers of training data between the plurality of training data sets.

In another example, a first threshold and a second threshold used for a first training data set are higher than a first threshold and a second threshold used for a second training data set if an average of degrees of difference of all combinations of two sets of training data of the second training data set is larger than an average of degrees of difference of all combinations of two sets of training data of the first training data set, in order to even the average of the degree of difference among the plurality of training data sets.

In some embodiments, the apparatus may divide one training data set into two or more new training data sets in response to determining that a number of training data in the one training data set exceeds a threshold. In these embodiments, the apparatus may divide one training data set such that the two or more new training data sets have the same or approximately the same number of training data, while a sum of averages of degrees of difference between training data in a set for each of the two or more new training data sets is minimized.

In some embodiments, the apparatus may perform some of the operations of FIG. 2 and some of the operations of FIG. 11. In these embodiments, the apparatus may perform S110-S180 of FIG. 2 to generate a training data set that includes dispersed training data. Then, the apparatus may perform S410-S480 of FIG. 11 using the training data set generated by S110-S180 as a plurality of sets of target training data. Thereby, the apparatus may generate the selected data set including dispersed training data for training.

The apparatus may further perform S110-S190 using the selected data set as a training data set obtained at S110. Thereby, the apparatus may update the training data set used for training when new target training data is obtained.

Figure 12:
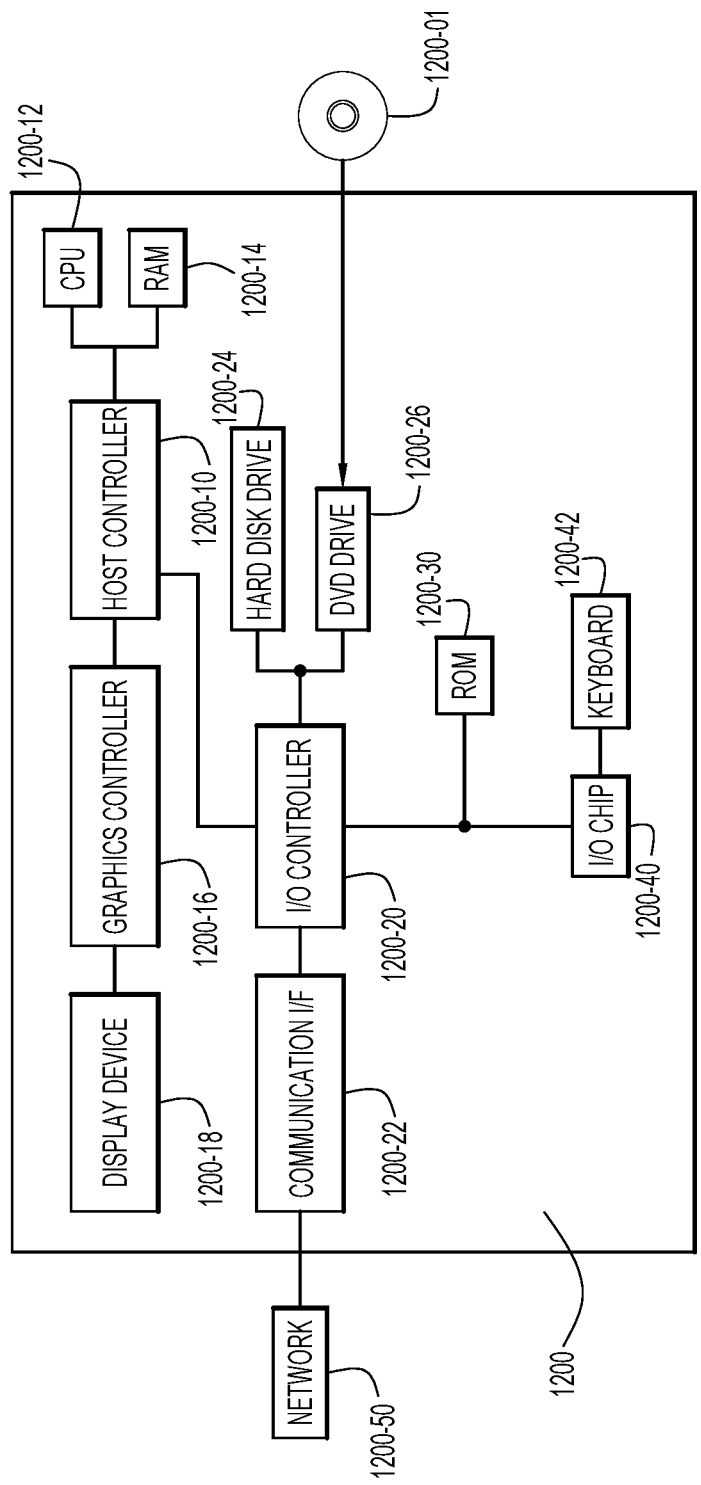
FIG. 12 shows an exemplary hardware configuration of a computer that functions as a system, according to an embodiment of the present invention.

FIG. 12 shows an exemplary hardware configuration of a computer configured for cloud service utilization, according to an embodiment of the present invention. A program that is installed in the computer 1200 can cause the computer 1200 to function as or perform operations associated with apparatuses of the embodiments of the present invention or one or more sections (including modules, components, elements, etc.) thereof, and/or cause the computer 1200 to perform processes of the embodiments of the present invention or steps thereof. Such a program may be executed by the CPU 1200-12 to cause the computer 1200 to perform certain operations associated with some or all of the blocks of flowcharts and block diagrams described herein.

The computer 1200 according to the present embodiment includes a CPU 1200-12, a RAM 1200-14, a graphics controller 1200-16, and a display device 1200-18, which are mutually connected by a host controller 1200-10. The computer 1200 also includes input/output units such as a communication interface 1200-22, a hard disk drive 1200-24, a DVD-ROM drive 1200-26 and an IC card drive, which are connected to the host controller 1200-10 via an input/output controller 1200-20. The computer 1200 also includes legacy input/output units such as a ROM 1200-30 and a keyboard 1200-42. The keyboard 800-42 is connected to the input/output controller 1200-20 through an input/output chip 1200-40.

The CPU 1200-12 operates according to programs stored in the ROM 1200-30 and the RAM 1200-14, thereby controlling each unit. The graphics controller 1200-16 obtains image data generated by the CPU 1200-12 on a frame buffer or the like provided in the RAM 1200-14 or in itself, and causes the image data to be displayed on the display device 1200-18.

The communication interface 1200-22 communicates with other electronic devices via a network 1200-50. The hard disk drive 1200-24 stores programs and data used by the CPU 1200-12 within the computer 1200. The DVD-ROM drive 1200-26 reads the programs or the data from the DVD-ROM 1200-01, and provides the hard disk drive 1200-24 with the programs or the data via the RAM 1200-14. The IC card drive reads programs and data from an IC card, and/or writes programs and data into the IC card.

The ROM 1200-30 stores therein a boot program or the like executed by the computer 1200 at the time of activation, and/or a program depending on the hardware of the computer 1200. The input/output chip 1200-40 may also connect various input/output units via a parallel port, a serial port, a keyboard port, a mouse port, and the like to the input/output controller 1200-20.

A program is provided by computer readable media such as the DVD-ROM 1200-01 or the IC card. The program is read from the computer readable media, installed into the hard disk drive 1200-24, RAM 1200-14, or ROM 1200-30, which are also examples of computer readable media, and executed by the CPU 1200-12. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1200-12 may execute a communication program loaded onto the RAM 1200-14 to instruct communication processing to the communication interface 1200-22, based on the processing described in the communication program. The communication interface 1200-22, under control of the CPU 1200-12, reads transmission data stored on a transmission buffering region provided in a recording device such as the RAM 1200-14, the hard disk drive 1200-24, the DVD-ROM 1200-01, or the IC card, and transmits the read transmission data to network 1200-50 or writes reception data received from network 1200-50 to a reception buffering region or the like provided on the recording device.

In addition, the CPU 1200-12 may cause all or a necessary portion of a file or a database to be read into the RAM 1200-14, the file or the database having been stored in an external recording device such as the hard disk drive 1200-24, the DVD-ROM drive 1200-26 (DVD-ROM 1200-01), the IC card, etc., and perform various types of processing on the data on the RAM 1200-14. The CPU 1200-12 may then write back the processed data to the external recording device.

Various types of information, such as various types of programs, data, tables, and databases, may be stored in the recording device to undergo information processing. The CPU 1200-12 may perform various types of processing on the data read from the RAM 1200-14, which includes various types of operations, processing of information, condition judging, conditional branch, unconditional branch, search/replace of information, etc., as described throughout this disclosure and designated by an instruction sequence of programs, and writes the result back to the RAM 1200-14.

In addition, the CPU 1200-12 may search for information in a file, a database, etc., in the recording device. For example, when a plurality of entries, each having an attribute value of a first attribute associated with an attribute value of a second attribute, are stored in the recording device, the CPU 1200-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording device such as a hard disk or a RAM provided in a server system connected to a dedicated communication network or the Internet can be used as the computer readable media, thereby providing the program to the computer 1200 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A computer program product including one or more computer readable storage media collectively having instructions embodied therewith, the instructions executable by a processor to cause the processor to perform operations comprising:
   selecting a first set of reference training data from a training data set based on a degree of difference between each set of reference training data in the training data set and target training data, wherein the first set of reference training data yields a smallest degree of difference from the target training data among all sets of reference training data in the training data set;
   determining that a degree of difference between the target training data and the first set of reference training data is below a first threshold, wherein the degree of difference is based on a distance;
   determining to include the target training data in the training data set in response to determining that an average degree of difference between the target training data and a first plurality of second sets of reference training data is larger than an average degree of difference between the first set of reference training data and a second plurality of second sets of reference training data, wherein the first and second plurality of second sets of reference training data are included in the training data set and do not include data from the first set of reference training data; and
   performing machine learning using the training data set with the included target training data.

2. The computer program product of claim 1, wherein the operations further comprise:
   determining to include second target training data in the training data set based on the degree of difference between the second target training data and a set of reference training data of the training data set closest to the second target training data being smaller than the degree of difference between the set of reference training data closest to the second target training data and other sets of reference training data in the training data set.

3. The computer program product of claim 2, wherein the operations further comprise:
   adding the second target training data to the training data set that corresponds to one group among a plurality of groups of training data, in response to determining to include the second target training data in the training data set.

4. The computer program product of claim 3, wherein the other sets of reference training data include a farthest-from-target set of reference training data that gives a largest degree of difference with the second target training data among all the sets of reference training data in the training data set.

5. The computer program product of claim 4, wherein the operations further comprise:
   determining to include the second target training data in the training data set and to exclude the farthest-from-target set of reference training data from the training data set, in response to determining:
     that the degree of difference between the second target training data and the set of reference training data closest to the second target training data is below a threshold,
     that the degree of difference between the second target training data and the farthest-from-target set of reference training data is equal to or above a second threshold, and
     that the degree of difference between the second target training data and the set of reference training data closest to the second target training data is smaller than the degree of difference between the farthest-from-target set of reference training data and the set of reference training data closest to the second training data.

6. The computer program product of claim 3, wherein the operations further comprise:
   selecting one or more sets of reference training data from each of the plurality of groups of training data, and
   performing the machine learning using the selected one or more sets of reference training data.

7. The computer program product of claim 3, wherein the operations further comprise:
   obtaining the second target training data; and
   determining the set of reference training data closest to the second target training data among all the sets of reference training data of the plurality of groups of training data.

8. The computer program product of claim 3, wherein the operations further comprise:
   generating a new group of training data including the second target training data in response to determining not to add the second target training data to the one group of the plurality of groups of training data.

9. The computer program product of claim 1, wherein the operations further comprise:
   replacing the first set of reference training data with the target training data in the training data set in response to determining to include the target training data in the training data set.

10. The computer program product of claim 9, wherein the first plurality of second sets of reference training data includes a second-closest-to-target set of training data that yields a second smallest degree of difference from the target training data among all of the sets of reference training data in the training data set.

11. The computer program product of claim 1, wherein the operations further comprise:
    determining to include second target training data in the training data set in response to determining that the degree of difference between the second target training data and a second-closest set of reference training data of the training data set to the second training data is larger than a degree of difference between a first-closest set of reference training data of the training data set to the second target training data and a closest set of reference training data of the training data set to the first-closest set of reference training data that gives a smallest degree of difference with the first-closest set of reference training data among all sets of reference training data in the training data set.

12. A method comprising:
    selecting a first set of reference training data from a training data set based on a degree of difference between each set of reference training data in the training data set and target training data, wherein the first set of reference training data yields a smallest degree of difference from the target training data among all sets of reference training data in the training data set;

determining that a degree of difference between the target training data and the first set of reference training data is below a first threshold, wherein the degree of difference is based on a distance;

determining to include the target training data in the training data set in response to determining that an average degree of difference between the target training data and a first plurality of second sets of reference training data is larger than an average degree of difference between the first set of reference training data and a second plurality of second sets of reference training data, wherein the first and second plurality of second sets of reference training data are included in the training data set and do not include data from the first set of reference training data; and performing machine learning using the training data set with the included target training data.

13. The method of claim 12, wherein the method further comprises:

determining to include second target training data in the training data set based on the degree of difference between the second target training data and a set of reference training data of the training data set closest to the second target training data being smaller than the degree of difference between the set of reference training data closest to the second target training data and other sets of reference training data in the training data set.

14. An apparatus comprising:

a processor; and one or more computer readable storage media collectively including instructions that, when executed by the processor, cause the processor to perform operations comprising:

selecting a first set of reference training data from a training data set based on a degree of difference between each set of reference training data in the training data set and target training data, wherein the first set of reference training data yields a smallest degree of difference from the target training data among all sets of reference training data in the training data set;

determining that a degree of difference between the target training data and the first set of reference training data is below a first threshold, wherein the degree of difference is based on a distance;

determining to include the target training data in the training data set in response to determining that an average degree of difference between the target training data and a first plurality of second sets of reference training data is larger than an average degree of difference between the first set of reference training data and a second plurality of second sets of reference training data, wherein the first and second plurality of second sets of reference training data are included in the training data set and do not include data from the first set of reference training data; and performing machine learning using the training data set with the included target training data.

15. The apparatus of claim 14, wherein the operations further comprise:

determining to include second target training data in the training data set based on the degree of difference between the second target training data and a set of reference training data of the training data set closest to the second target training data being smaller than the degree of difference between the set of reference training data closest to the second target training data and other sets of reference training data in the training data set.

16. The apparatus of claim 14, wherein the operations further comprise:

replacing the first set of reference training data with the target training data in the training data set in response to determining to include the target training data in the training data set.

* * * * *